United States Patent [19]

Ueno et al.

[11] 4,315,778

[45] Feb. 16, 1982

[54] FLUX COMPOSITION FOR CERAMIC COLOR, CONTAINING NO HARMFUL HEAVY METAL

[76] Inventors: Kimitoshi Ueno, 1-17-9, Nishi Mizuhodai, Fujimishi, Saitamaken; Toshio Yoshida, 3928, Fujikubo, Miyoshimachi, Irumagun, Saitamaken, both of Japan

[21] Appl. No.: 137,956

[22] Filed: Apr. 7, 1980

[30] Foreign Application Priority Data

Jul. 5, 1979 [JP] Japan .................................. 54-84450

[51] Int. Cl.³ ............................ C09D 5/34; C03C 3/22
[52] U.S. Cl. .......................................... 106/19; 501/2; 501/57; 501/58; 501/73; 501/135
[58] Field of Search ............................ 106/52, 19, 39.6

[56] References Cited

U.S. PATENT DOCUMENTS 4,160,654  7/1979  Bartholomew et al. ............... 106/52
4,179,300  12/1979  Sagara ..................................... 106/52
4,212,919  7/1980  Hoga ...................................... 106/52

FOREIGN PATENT DOCUMENTS 47-680925 of 1972 Japan .

*Primary Examiner*—John Kight, III
*Assistant Examiner*—Amelia B. Yarbrough

[57] ABSTRACT

A flux composition for ceramic color, containing no harmful heavy metal such as lead, cadmium, chromium, etc. is provided.

The flux composition consists mainly of 30 to 45% of $SiO_2$, 0 to 5% of $TiO_2$, 4 to 10% of $ZrO_2$, 13 to 18% of $B_2O_3$, 18 to 23% of ZnO, 0 to 3% of CaO, 12 to 15% of the total of two or three kinds of $R_2O$ selected from $Na_2O$, $K_2O$ and $Li_2O$, 4 to 10% of fluorine and 0 to 5% of tin oxide (% being all by weight).

The composition uses no lead which has been indispensable for lower melting glasses, and exhibits superior performances difficult to afford according to conventional lower melting lead-free fluxes.

1 Claim, No Drawings

FLUX COMPOSITION FOR CERAMIC COLOR, CONTAINING NO HARMFUL HEAVY METAL

This invention relates to fluxes for ceramic color which do not contain harmful heavy metal or metals.

In the fluxes presently in use for ceramic color for the purpose of printing decorative designs, or trademarks, or indicating scales, etc. on glass vessels or the like, at least one harmful heavy metal such as lead, barium, cadmium or the like is usually used. These heavy metals may lead to the dangers of physical damage caused at the time of production and processing ceramic color, and the pollution of working environment, requiring a great deal of expenses for the equipments of waste disposal. Also, it causes apprehension among consumers that environmental pollution may occur.

With the above problems in mind, the present invention has been attained after earnest research works to obtain a flux composition in which such harmful heavy metals as lead, cadmium, barium, chromium or the like are not used.

To such ceramic color fluxes there are severe requirements of properties such that the baking temperature should be lower than the softening temperatures of vessels, i.e. they should be about 600° C. and should not be over 620° C. at the highest, their expansion coefficients should be close to those of glass vessels, they should have a good waterproofing characteristic, good alkali and acid resistance, and so on. On this account it has heretofore been impossible for commercially available products to satisfy these requirements unless harmful metals mainly of lead, cadmium, barium, etc. among the components are contained.

In the present invention a successful result has been attained by balancing the contents of alkali metals, an alkaline earth metal, and a zinc group element. Namely an objective material has been obtained by a composition consisting of 30 to 45% by weight of $SiO_2$, 0 to 5% by weight of $TiO_2$, 4 to 10% by weight of $ZrO_2$, 13 to 18% by weight of $B_2O_3$, 18 to 23% by weight of ZnO, 0 to 3% by weight of CaO, 12 to 15% of the total of two or three kinds of $R_2O$ selected from $Na_2O$, $K_2O$ and $Li_2O$, 4 to 10% by weight of fluorine and 0 to 5% by weight of tin oxide.

Among the above-mentioned compositions, it is preferable, in view of melting property of the flux, that any of $Na_2O$, $K_2O$ and $Li_2O$ of the $R_2O$ component does not exceed two third of the total amount of $R_2O$ components. Also when the total amount of $Na_2O$, $K_2O$ and $Li_2O$ is greater than the amount of ZnO, where molar fraction of the $R_2O$ component > molar fraction of ZnO, the expansion coefficient increases and cracks are formed. If the amount of the ZnO component is 23% or more, the softening point is elevated. If the amount of the $B_2O_3$ component is 13% or less in the flux, the softening point is also elevated, and when it is 18% or more, resistance to chemicals is deteriorated. Further, when the amounts of the CaO and $TiO_2$ components are 3% or less, these components do not greatly influence the softening point of the expansion coefficient, and CaO has an effect of elevating the initial alkali resistance and $TiO_2$ has an effect of elevating initial acid resistance. The $ZrO_2$ is necessary for enhancing the resistance to chemicals. Tin oxide also is effective for enhancing the resistance to chemicals. Fluoride is necessary for lowering the softening point.

Mixed raw materials of oxides or salts which become oxides and a fluoride in the above-mentioned compositon are heated and melted at a temperature of 1100° C.~1350° C. and then they are quenched, wet ground using a ball-mill or the like, dehydrated and dried to powder.

The flux thus obtained was milled with an organic vehicle together with a heat-resistant inorganic pigment, and a paste-like or paint-like ceramic color is obtained. The organic vehicle used herein is one which gives good wetting to the flux and provides suitability of application.

A typical such composition is from 10 to 30% by weight of at least one kind of a resin component such as rosin type resin, cellulose type resin, acrylic resin or the like dissolved in from 70 to 90% by weight of an organic solvent such as pine oil or the like. It is also possible to make the composition thermoplastic paste using a wax in place of an organic solvent such as pine oil or the like.

Following examples are to illustrate the composition of the present invention, and should not be construed as limiting the scope of the claim. All parts and % are by weight.

EXAMPLE I

The following oxides, oxide-forming salts and fluoride are admixed

| Component | Parts by weight |
| --- | --- |
| Sodium Carbonate | 7 |
| Potassium Carbonate | 6 |
| Lithium Carbonate | 10 |
| Zinc Oxide | 20 |
| Calcium Carbonate | 5 |
| Boric Acid | 30 |
| Silicon Dioxide | 35 |
| Titanium Dioxide | 3 |
| Zirconium Silicate | .5 |
| Sodium Fluorosilicate | 5 |

The mixed raw materials were charged in a crucible made of a refractory material and heated and melted at a temperature of 1200° C. The melted materials were quenched by dropping in water to form small pieces in order to make the subsequent step of crushing easier. Then the quenched pieces were charged in a ball mill together with a suitable amount of water and finely divided, followed by dehydration and drying to obtain fine powder.

EXAMPLE II

Raw materials were mixed, melted and ground to a flux of fine powder as in Example 1 in the following ratio:

| Component | Parts by weight |
| --- | --- |
| Sodium Carbonate | 10 |
| Potassium Nitrate | 6 |
| Lithium Carbonate | 8 |
| Zinc Oxide | 23 |
| Calcium Carbonate | 5 |
| Boric Acid | 25 |
| Silicon Dioxide | 35 |
| Titanium Dioxide | 3 |
| Zirconium Silicate | 10 |
| Sodium Fluorosilicate | 5 |

EXAMPLE III

Following raw materials were mixed, melted and ground to a flux of fine powder as in Example I:

| Component | Parts by weight |
|---|---|
| Sodium Carbonate | 4 |
| Potassium Nitrate | 9 |
| Lithium Carbonate | 7 |
| Zinc Oxide | 20 |
| Calcium Carbonate | 3 |
| Boric Acid | 25 |
| Silicon Dioxide | 29 |
| Titanium Dioxide | 4 |
| Zirconium Silicate | 13 |
| Sodium Fluorosilicate | 9 |

The fluxes obtained in Examples 1, 2 and 3 were compared with commercially available products.

For this purpose, to 900 g of the powder of the flux of Example 1 and 100 g of titanium white, an oil consisting of 75% by weight of pine oil, 20% by weight of rosin type resin, and 5% by weight of cellulose type resin, as an organic vehicle was added. After mixing in a muller mixer, the mixture was milled to form a paste like ceramic color. An organic vehicle was added to 900 g of the flux powder of Example II and 130 g of cobalt blue, and they were processed as in Example 1 to form a paste like ceramic color, and thus comparisons were carried out.

The resulting paste ceramic colors were applied by screen printing on a commercially available soda-lime-silica glass using a 180 mesh screen and baked at a temperature of 560°~620° C. The printed and baked glass plates were tested for alkali resistance and acid resistance under the condition of (A) and (B)

(A) Alkali resistance test

| Test solution | NaOH | 9% by weight |
|---|---|---|
| | $Na_3PO_4 \cdot 12H_2O$ | 1% by weight |
| | pure water | 90% by weight | dipped at 88° C.±1° C. for 2 hours and 15 hours (B) Acid resistance test

| Test solution | 38% HCl | 10% by volume |
|---|---|---|
| | pure water | 90% by volume | dipped at 27° C.±5° C. for 10 minutes.

The results of the tests, and the presence or absence of cracks due to differences of the expansion coefficients are shown in the Table together with compositions of flux powder.

| | Flux I of the present invention | Flux II of the present invention | Flux III of the present invention | Commercial flux containing no lead | Commercial flux containing lead |
|---|---|---|---|---|---|
| $SiO_2$ | 42 parts | 35 parts | 37 parts | 31.9 parts | 36.3 parts |
| $TiO_2$ | 3 | 3 | 4 | 3 | 2.7 |
| $ZrO_2$ | 5 | 10 | 9 | | 2.5 |
| $B_2O_3$ | 17 | 14 | 14 | 21.2 | 7.6 |
| ZnO | 20 | 23 | 20 | 16 | |
| CaO | 3 | 3 | 2 | | |
| CdO | | | | | 3.5 |
| PbO | | | | | 39.0 |
| BaO | | | | 20.6 | |
| $Na_2O$ | 4 | 6 | 6 | 8.8 | |
| $K_2O$ | 4 | 3 | 4 | | 2.8 |
| $Li_2O$ | 4 | 3 | 3 | | 2.0 |
| F | 5 | 5 | 5 | 5.4 | 3.6 |
| Baking temperature | 600° C. | 600° C. | 600° C. | 600° C. | 600° C. |
| (A) test | good | good | good | bad | good |
| (B) test | good | good | good | bad | good |
| Cracks | none | none | none | yes | none |

It is seen from the above-indicated results that the flux according to the present invention uses no lead the use of which has heretofore been considered as an indispensable condition for lower melting glasses, and further, it is possible to control the expansion coefficient and also impart water resistance, alkali resistance and acid resistance, such performances having been difficult to afford according to conventional lower melting lead-free fluxes. Moreover, since it does not contain any harmful heavy metal, there is no fear of environmental pollution and public nuisance.

What is claimed is:

1. A flux composition for ceramic color containing no heavy metal and comprising 30 to 45% by weight of $SiO_2$, 0 to 5% by weight of $TiO_2$, 4 to 10% by weight of $ZrO_2$, 13 to 18% by weight of $B_2O_3$, 18 to 23% by weight of ZnO, 0 to 3% by weight of CaO, 12 to 15% by weight of the total of two or three kinds of $R_2O$ selected from $Na_2O$, $K_2O$ and $Li_2O$, 4 to 10% by weight of fluorine and 0 to 5% by weight of tin oxide.

* * * * *